United States Patent Office 3,803,268
Patented Apr. 9, 1974

3,803,268
POLYMONOOLEFINS STABILIZED WITH POLYPHENYLENE ETHERS
Gordon D. Brindell, Crystal Lake, and Rudolph F. Macander, Cary, Ill., assignors to The Quaker Oats Company, Chicago, Ill.
No Drawing. Filed May 15, 1972, Ser. No. 253,287
Int. Cl. C08f 29/12
U.S. Cl. 260—897 R                     10 Claims

ABSTRACT OF THE DISCLOSURE

Polyolefins stabilized with polyphenylene ethers of the following formula are disclosed:

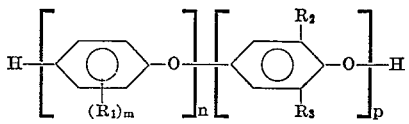

wherein $R_1$ is hydrogen, primary alkyl, or secondary alkyl; $R_2$ and $R_3$ are primary alkyl, secondary alkyl, primary aralkyl, or secondary aralkyl; $m$ is an integer between 1 and 2 inclusive; and the sum of $n+p$ is an integer between 2 and 100 inclusive with the further condition that $p$ is never 0.

BACKGROUND OF THE INVENTION

Field of the invention

This invention relates to novel polyolefin compositions with improved resistance to oxidative deterioration.

DESCRIPTION OF THE PRIOR ART

U.S. Pat. No. 3,630,900 teaches the use of linear polymers of the following general formula as high temperature stabilizers for lubricating oils:

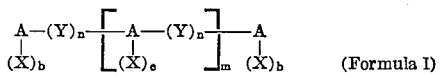

(Formula I)

wherein A represents a benzene nucleus, Y represents a metal-free bivalent radical selected from the group consisting of —O—, —NH—, —NR—, —S—, —SO—, and —SO$_2$—, wherein R is a group having from 1 to 60 carbon atoms and from 0 to 10 nitrogen atoms, $b$ is an integer from 2 to 5, $c$ is an integer from 2 to 4, $m$ is at least 8, $n$ is 0 to 1, and X is selected from the group consisting of $C_{1-30}$ alkyl, OH, Cl, $NO_2$, $SO_3H$, —B, —$SO_2B$ and —ZB, wherein B represents an amine group having from 1 to 10 nitrogen atoms and from 0 to 60 carbon atoms, and Z represents a carbonyl hydrocarbyl group having from 1 to 20 carbon atoms and from 1 to 2 carbonyl radicals, at least one of which is attached to the amine group B.

We have unexpectedly found that particular linear polymers of Formula I are good antioxidants in polyolefins.

SUMMARY OF THE INVENTION

The present invention may be briefly described as a polyolefin stabilized with a polyphenylene ether having the following structural formula:

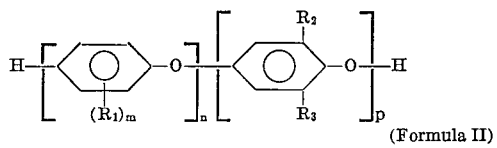

(Formula II)

wherein $R_1$ is hydrogen, primary alkyl, or secondary alkyl; $R_2$ and $R_3$ are primary alkyl, secondary alkyl, primary aralkyl, or secondary aralkyl; $m$ is an integer between 1 and 2 inclusive; and the sum of $n+p$ is an integer between 2 and 100 inclusive with the further stipulation that $p$ is never 0.

The present invention may further be described as a process for stabilizing polyolefins which comprises incorporating with said polyolefin from 0.01 percent to 10 percent by weight of a polyphenylene ether of Formula II.

The antioxidants of the present invention have increased stability and decreased volatility over known stabilizers for polyolefins and are, therefore, advantageous for high temperature applications.

By alkyl in Formula II we mean to include methyl, ethyl, propyl, butyl, pentyl, hexyl, heptyl, etc., and where the alkyl group contains three or more carbon atoms we mean to include straight or branched chain groups provided that the carbon alpha to the phenylene group is primary or secondary. We prefer that the alkyl group contains from 1 to 10 carbon atoms. Preferred alkyl groups include for example, methyl, ethyl, isopropyl, isobutyl, sec-butyl, 1-methylbutyl, 2-methylbutyl, neopentyl, 1-methylpentyl, 1-ethylpentyl, 2-methylpentyl, 2,2-dimethylpentyl, 2-ethylpentyl, 2,2-diethylpentyl, 1-methylhexyl, 1-ethylhexyl, 2-methylhexyl, 2,2-dimethylhexyl, 2-ethylhexyl, 2-ethyl-2-methylhexyl, etc.

The aralkyl in Formula II includes both aralkyl and substituted aralkyl wherein the carbon alpha to the phenylene group is primary or secondary. Suitable aralkyl groups include, but are not limited to benzyl and styryl. Appropriate substituted aralkyl groups include, for example, chlorobenzyl, bromobenzyl, iodobenzyl, fluorobenzyl, methoxybenzyl, ethoxybenzyl, methylbenzyl, ethylbenzyl, or tert-butylbenzyl. We prefer that the aralkyl group contains less than 20 carbon atoms. Where the alkylene portion of the aralkyl group contains two or more carbons, the alkylene group may be straight or branched chain. We prefer that when the aralkyl group is substituted that it be with a group which is halo, alkoxy, or alkyl. Any substitution is on the aryl portion of the aralkyl group and may be made for one or all of the available hydrogens. Suitable halo groups include chloro, bromo, iodo, and fluoro. Suitable alkoxy and alkyl groups include those containing from 1 to 13 carbon atoms.

Exemplary polyphenylene ethers include the following:

poly(2,6-dimethyl-1,4-phenylene)ether;
poly(2,6-diethyl-1,4-phenylene)ether;
poly(2,6-diisopropyl-1,4-phenylene)ether;
poly(2,6-diisobutyl-1,4-phenylene)ether;
poly(2,6-diisobutyl-1,4-phenylene)ether;
poly(2,6-di-sec-butyl-1,4-phenylene)ether;
poly[2,6-di(1'-methylbutyl)-1,4-phenylene]ether;
poly[2,6-di(2'-methylbutyl)-1,4-phenylene]ether;
poly(2,6-di-neopentyl-1,4-phenylene)ether;
poly[2,6-di(1'-methylpentyl)-1,4-phenylene]ether;
poly[2,6-di(1'-ethylpentyl)-1,4-phenylene]ether;
poly[2,6-di(2'-methylpentyl)-1,4-phenylene]ether;
poly[2,6-di(2',2'-dimethylpentyl)-1,4-phenylene]ether;
poly[2,6-di(2'-ethylpentyl)-1,4-phenylene]ether;
poly[2,6-di(2',2'-diethylpentyl)-1,4-phenylene]ether;
poly[2,6-di(1'-methylhexyl)-1,4-phenylene]ether;
poly[2,6-di(1'-methylhexyl)-1,4-phenylene]ether;
poly[2,6-di(2'-methylhexyl)-1,4-phenylene]ether;
poly[2,6-di(2',2'-dimethylhexyl)-1,4-phenylene]ether;
poly[2,6-di(2'-ethylhexyl)-1,4-phenylene]ether;
poly[2,6-di(2'-ethyl-2'-methylhexyl)-1,4-phenylene]ether;
poly(2-methyl-6-isopropyl-1,4-phenylene)ether;
poly(2-methyl-6-sec-butyl-1,4-phenylene)ether;
poly(2,6-distyryl-1,4-phenylene)ether;

poly(2,6-dibenzyl-1,4-phenylene)ether;
poly[2,6-di(4'-chlorobenzyl)-1,4-phenylene]ether;
poly[2,6-di(4'-bromobenzyl)-1,4-phenylene]ether;
poly[2,6-di(4'-iodobenzyl)-1,4-phenylene]ether;
poly[2,6-di(4'-fluorobenzyl)-1,4-phenylene]ether;
poly[2,6-di(4'-methoxybenzyl)-1,4-phenylene]ether;
poly[2,6-di(4'-ethoxybenzyl)-1,4-phenylene]ether;
poly[2,6-di(4'-methylbenzyl)-1,4-phenylene]ether;
poly[2,6-di(4'-ethylbenzyl)-1,4-phenylene]ether;
poly[2,6-di(4'-tert-butylbenzyl)-1,4-phenylene]ether.

Exemplary block polyphenylene ethers include the following: copolymers of phenol and 2,6-dimethylphenol wherein the terminal phenolic group is 2,6-dimethylphenol; copolymers of 2,6-dimethylphenol and 2,6-diisopropylphenol; and copolymers of 2-isopropylphenol and 2,6-diisopropylphenol wherein the terminal phenolic group is 2,6-diisopropylphenol.

Very favorable results have been obtained wherein $R_1$, $R_2$, and $R_3$ are primary alkyl wherein there is at least one alkyl branch on the carbon beta to the phenylene group. Examples of these preferred polyphenylene ethers include the following:

poly(2,6-di-isobutyl-1,4-phenylene)ether;
poly[2,6-di(2'-methylbutyl)-1,4-phenylene]ether;
poly[2,6-di(2'-ethylbutyl)-1,4-phenylene]ether; and
poly[2,6-di(2'-ethylhexyl)-1,4-phenylene]ether.

The polyphenylene ethers useful in this invention may be obtained by the method disclosed in U.S. Pat. 3,306,875 or by the method of Example 1. The block polyphenylene ethers are prepared by step copolymerization of the phenols. The molecular weight of the polyphenylene ether may vary within wide limits. In general, polymers wherein $n+p$ in Formula II is an integer between 2 and 100 can be used; however, polymers wherein $n+p$ is an integer between 2 and 50 carbon atoms are preferred.

Suitable phenols for use in preparing the polyphenylene ethers include those of the formula:

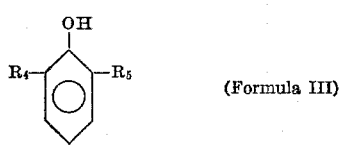

(Formula III)

wherein $R_4$ and $R_5$ are consistent with $R_1$, $R_2$, and $R_3$ in Formula II. All of the suitable phenols are commercially available or prepared by known techniques.

The term "polyolefin" as used herein means those polymers derived from monoolefins and is intended to include such polymers as polyethylene, polypropylene, and ethylene-propylene terpolymers.

In general, the polyphenylene ethers of Formula II should be used with the polyolefin to be stabilized in an amount effective and sufficient to stabilize the material. The requisite amount will, of course, depend both on the efficiency of the particular polyphenylene ether, and on the nature of the polyolefin in which it is employed. It has been our experience that from 0.01 percent to 10 percent by weight based on the weight of the polyolefin is sufficient. Amounts down to as little as 0.0001 percent by weight may be effective in some cases.

It is to be understood that the stabilizing effect of the polyphenylene ethers is considerably enhanced by conventional synergists such as certain sulfides and polysulfides. The synergist is used in conventional amounts. For example an amount of synergist from about 0.1 percent to about 1 percent by weight of the polyolefin to be stabilized is satisfactory but we prefer to use from 0.1 percent to 0.5 percent by weight.

As sulfides there may be mentioned dialkylsulfides, particularly wherein the alkyl groups are long chain such as dodecyl groups since the lower dialkylsulfides are too volatile to be effective, di(substituted)alkylsulfides particularly esters of bis-carboxyalkyl sulfides such as dilauryl, distearyl, ditridecyl, or dioctadecyl thiodipropionates or thiodibutyrates, dibenzylsulfides such as bis(2-hydroxy-5-methylbenzyl)sulfide and bis(3-tert-butyl-2-hydroxy-5-methoxybenzyl)sulfide, diaryl sulfide, sulfides such as diphenyl sulfide, dicresyl sulfide, 2:2'-dihydroxy-5:5'-dimethyl diphenyl, diphenyldisulfide, dialkyldithiophosphates such as bis(diisopropyldithiophosphoryl)disulfide, and dialkyldithiophosphatomethylphenols.

In will further be understood that the polyolefin in addition to containing a stabilizing amount of polyphenylene ether and a synergist may contain such other ingredients as other antioxidants, coloring agents, fillers, curing agents, etc.

DESCRIPTION OF THE PREFERRED EMBODIMENTS

The following embodiments of this invention are shown for the purpose of illustrating the invention and demonstrate the best mode for practicing the invention. It will be apparent to those skilled in the art that various changes and modifications may be made therein without departing from the spirit and scope of the invention as it is more precisely defined in the subjoined claims.

EXAMPLE 1

In a 1000-ml. flask, 33.3 g. of 2,6-di(2-ethylhexyl)-phenol was placed. Sodium hydroxide pellets, 8.0 g., were dissolved in 250 ml. of methanol and then added to the 2,6-di(2'-ethylhexyl)-phenyl in the flask. The methanol was almost completely evaporated from the flask and then 900 ml. of benzene was added. Air was bubbled through the stirred admixture for 23 hours.

The benzene was extracted from the reaction mixture with 500 ml. of water and then was stripped to yield 31.8 g. of oily residue.

Methylene dichloride, 150 ml., was added to the residue. Then the methylene chloride solution was added to a mixture of 6 ml. of hydrochloric acid in 600 ml. of methanol. The solution was then decanted. The polymeric residue was redissolved in methylene dichloride and reprecipitated by slowly pouring into a solution of hydrochloric acid, and methanol and again separated by decantation. The polymeric residue was dried and found on analysis to be poly[2,6-di(2'-ethylhexyl)phenylene]ether having a number-average of molecular weight of 1300 as determined by vapor pressure osmometry.

EXAMPLE 2

The performance of the polyphenylene ether as an antioxidant for polypropylene was determined in the following tests:

In Test 1 an 80 g. of Hercules Pro-Fax 6501 polypropylene powder was admixed in a Brabender Plasticorder in which the mixing chamber was heated to about 200° C. The material was mixed for 5 to 10 minutes until the polypropylene had a workable consistency. A sample of the material was then removed and molded into a 5 mil film. One inch diameter circles of the film were cut out and put into an oven maintained at 140° C. After 1 hour in the oven, the sample crumbled.

In Test 2, 0.24 g. of dilaurylthiodipropionate was mixed with the 80 g. of polypropylene powder and a sample tested for heat aging as in Test 1. The sample lasted for 70 hours before it crumbled.

The procedure of Test 1 was repeated in Test 3 except that 0.08 g. of poly[2,6-di(2'-ethylhexyl)-1,4-phenylene] ether prepared in Example 1 was added to the polypropylene powder. A 5 mil film sample tested as in Test 1 lasted 5 hours before crumbling.

Test 4 was conducted like Test 2 except that 0.08 g. of the poly[2,6 - di(2' - ethylhexyl)-1,4-phenylene]ether prepared in Example 1 was also incorporated into the polypropylene powder. The sample from this test lasted for 691 hours.

Test 5 was conducted similarly to Test 1 except that 0.08 g. of 2,6-di-tert-butyl-p-cresol was added to the polypropylene powder. The sample lasted for 2 hours.

In Test 6 the procedure of Test 2 was repeated except that 0.08 g. of 2,6-di-tert-butyl-p-cresol was added to the polypropylene powder. The sample in this test lasted for 103 hours.

EXAMPLE 3

Poly[2,6 - di(2'-ethylhexyl)phenylene]ether from Example 1, and 2,6-di-tert-butyl-p-cresol were evaluated in this example as antioxidants for turbine oil. A modification of ASTM D943–IP157 was used. The following modifications were made: 15 inches of electrolytic copper wire No. 14 Brown and Sharpe gage and 15 inches of low-metalloid steel wire No. 16 Washburn and Moen gage were used to wind the mandrel; 150 ml. of an unstabilized base oil provided by American Oil Company was used; oil temperature was held at 150° C. during the test; and the air flow rate was adjusted to 3.0 liters per hour.

In Test 7, 0.60 g. of 2,6-di-tert-butyl-p-cresol was added to the oil. Every 24 hours at 5–10 g. sample of oil was removed from the oil tube. The acid number (mg. KOH/g. sample) of the sample was determined and the time required to reach an acid umber of 2.0 was determined. In this test it took 7 days for the acid number to reach 2.0.

Following the above procedure in Test 8 the effectiveness of poly[2,6-di(2'-ethylhexyl)phenylene]ether in place of the 2,6-di-tert-butyl-p-cresol as a stabilizer for turbine oil was determined. In this test it took 2 days for the acid number of the oil to reach 2.0.

The above examples clearly demonstrate the accomplishment of this invention. Example 1 demonstrates our preferred method for obtaining the polyphenylene ethers useful in our invention.

In Example 2 a comparison of Test 4 with Test 6 clearly demonstrates the unexpected superiority of polyphenylene ethers of Formula II as antioxidants in polyolefins over the conventional antioxidant 2,6-di-tert-butyl-p-cresol. Tests 1, 2, 5, and 6 are not embodiments of our invention but were prepared for the purposes of comparison with Tests 3 and 4.

In Example 3 a comparison of Test 7 with Test 8 shows that polyphenylene ethers of Formula II do not distinguish themselves as antioxidants in turbine oils in comparison with 2,6-di-tert-butyl-p-cresol. Neither Test 7 nor Test 8 are embodiments of our invention but were prepared to compare with the results of Example 2. The excellent ability of polyphenylene ethers to stabilize polyolefins in Example 2 as compared to that of 2,6-di-tert-butyl-p-cresol is unexpected in view of their lackluster performance in Example 3 in turbine oil.

From the foregoing description we consider it to be clear that the present invention contributes a substantial benefit to the antioxidant art by providing a new and useful antioxidant for polyolefins.

We claim:

1. A polyolefin selected from the group consisting of polyethylene and polypropylene stabilized with a polyphenylene ether having the following structural formula:

$$\left[ H-\underset{(R_1)_m}{\underset{|}{\bigcirc}}-O \right]_n \left[ \underset{R_3}{\overset{R_2}{\underset{|}{\bigcirc}}}-O \right]_p H$$

wherein $R_1$ is hydrogen, primary alkyl, or secondary alkyl; $R_2$ and $R_3$ are primary alkyl, secondary alkyl, primary aralkyl, or secondary aralkyl; $m$ is an integer between 1 and 2 inclusive; and the sum of $n+p$ is an integer between 2 and 100 inclusive with the further condition that $p$ is never 0, said polyphenylene ether being present in a stabilizing amount up to 10 percent by weight of the polyolefin.

2. The composition of claim 1 wherein the sum of $n+p$ in the formula is an integer between 2 and 50 inclusive.

3. The composition of claim 1 wherein a dialkylsulfide is present as a synergist.

4. The composition of claim 3 wherein $R_1$, $R_2$, and $R_3$ are primary or secondary alkyl and said primary alkyl or said secondary alkyl group contains from 1 to 10 carbon atoms.

5. The composition of claim 3 wherein $R_1$, $R_2$, and $R_3$ are primary aralkyl or secondary aralkyl and said primary aralkyl group or said secondary aralkyl group contains less than 20 carbon atoms.

6. The composition of claim 3 wherein $R_1$, $R_2$, and $R_3$ are primary alkyl and there is at least one alkyl branch in the primary alkyl group on the carbon beta to the phenylene group.

7. The composition of claim 3 wherein the polyphenylene ether is poly(2,6-di-isobutyl-1,4-phenylene)ether.

8. The composition of claim 3 wherein the polyphenylene ether is poly[2,6-di(2'-methylbutyl)-1,4-phenylene]ether.

9. The composition of claim 3 wherein the polyphenylene ether is poly[2,6 - di(2'-ethylbutyl)-1,4-phenylene]ether.

10. The compositon of claim 3 wherein the polyphenylene ether is poly[2,6-di(2'-ethylhexyl)-1,4-phenylene]ether.

References Cited

UNITED STATES PATENTS

| | | | |
|---|---|---|---|
| 3,361,851 | 1/1968 | Gowan | 260—89.7 |
| 3,630,900 | 12/1971 | Van der Voort | 252—47.5 |
| 2,765,292 | 10/1956 | Groff et al. | 260—45.5 |

OTHER REFERENCES

Hackh's Chemical Dictionary, p. 593, Pub. 1961, Third Edition, McGraw-Hill.

JOHN C. BLEUTGE, Primary Examiner

C. J. SECCURO, Assistant Examiner

U.S. Cl. X.R.

260—45.7 S, 45.95, 45.85